UNITED STATES PATENT OFFICE.

GIDEON LUCY, OF MOBILE, ALABAMA.

IMPROVEMENT IN MEDICAL COMPOUNDS FOR TREATING RHEUMATISM, &c.

Specification forming part of Letters Patent No. 138,335, dated April 29, 1873; application filed April 5, 1873.

*To all whom it may concern:*

Be it known that I, GIDEON LUCY, M. D., of Mobile, in the county of Mobile and State of Alabama, have invented a new and useful Improvement in Medical Compound, of which the following is a specification:

This invention and discovery relates to the curative art; and consists in a compound composed of the materials hereinafter named, to be used as a medicine for the cure of rheumatism, neuralgia, and similar nervous diseases, and also for the human system generally, as its effects upon the blood, kidneys, and other organs has been found most salutary.

The ingredient which renders my medicine a remedy for many diseases is a plant which grows sparsely in some sections of the pine regions of the southern states, the common name of which is lint plant. Its botanical name is unknown.

The medicine in one form is composed of a tincture or extract containing about one ounce of the root of the lint plant, combined with about one pint of diluted alcohol. The root of this plant may be macerated or reduced to a pulp, or be concentrated by boiling, and combined with any other material to form a sirup or for making pills for medicinal purposes.

I do not confine myself to any precise proportions when combined with alcohol or other ingredients, as the quantities of each may be varied according to circumstances.

Having thus described my invention, I claim as new and desire to secure by Letters Patent—

A medicine of which the lint plant (or extract thereof) forms a component part, substantially as described.

GIDEON LUCY, M. D.

Witnesses:
   WM. H. WILSON,
   LYCURGUS LUCY.